United States Patent [19]
Seyferth et al.

[11] Patent Number: 4,767,876
[45] Date of Patent: * Aug. 30, 1988

[54] METHOD FOR CONVERTING ORGANOSILICON POLYMERS CONTAINING SIH REPEAT UNITS AND ORGANOPOLYSILAZANE PRECURSORS TO NEW AND USEFUL PRECERAMIC POLYMERS AND SILICON NITRIDE ENRICHED CERAMIC MATERIALS

[75] Inventors: Dietmar Seyferth, Lexington; Joanne M. Schwark, Cambridge, both of Mass.; Yuan-Fu Yu, Dayton, Ohio

[73] Assignee: Massachusetts Institute of Technology, Cambridge, Mass.

[ * ] Notice: The portion of the term of this patent subsequent to Mar. 17, 2004 has been disclaimed.

[21] Appl. No.: 916,109

[22] Filed: Oct. 7, 1986

Related U.S. Application Data

[63] Continuation-in-part of Ser. No. 781,934, Sep. 30, 1985, Pat. No. 4,656,837.

[51] Int. Cl.$^4$ .............................. C07F 7/08; C07F 7/10
[52] U.S. Cl. .................................... 556/410; 556/411; 556/412; 528/14; 528/21; 528/22; 528/28; 528/31; 528/32; 528/33; 528/34; 528/35; 528/38
[58] Field of Search ................ 556/411, 412, 410; 528/28, 38, 31, 14, 32, 33, 21, 34, 35, 22

[56] References Cited

U.S. PATENT DOCUMENTS

| | | | |
|---|---|---|---|
| 3,108,985 | 10/1963 | Weyer | 260/37 |
| 3,393,218 | 7/1968 | Van Wazer et al. | 556/412 |
| 3,853,567 | 12/1974 | Verbeek | 106/44 |
| 3,892,583 | 7/1975 | Winter et al. | 106/55 |
| 4,255,549 | 3/1981 | Christophliemk et al. | 556/410 X |
| 4,310,651 | 12/1982 | Baney et al. | 528/21 |
| 4,312,970 | 1/1982 | Gaul, Jr. | 526/279 |
| 4,482,669 | 11/1984 | Seyferth et al. | 524/442 |
| 4,639,501 | 1/1987 | Seyferth et al. | 528/15 |
| 4,650,837 | 3/1987 | Seyferth et al. | 525/478 |

OTHER PUBLICATIONS

R. W. Rice, Amer. Ceram. Soc. Bull. 62:889–892 (1983).
Penn et al., J. Appl. Polymer Sci, 27:3751–3761 (1982).
S. Yajima, Amer. Ceram. Soc. Bull. 62:893–898 903 (1983).
K. Okamura et al., Chem. Lett. (1984) 2059–2060.
Seyferth et al., Inorg. Chem. 22 2163–2167 (1983).
Aitken, C., et al., J. Organomet Chem. 279: C11–C13 (1985).

Primary Examiner—Paul F. Shaver
Attorney, Agent, or Firm—George W. Neuner; Ronald I. Eisenstein

[57] ABSTRACT

A method of forming preceramic polymers using an organosilicon polymer containing Si—H repeat units by reacting it with alkali metal amide or silylamide is disclosed. Preferably, the silylamide is a polymeric silylamide formed by reacting in solution anhydrous ammonia with a mixture of $R^1SiHX_2$ (where $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms or a substituted or unsubstituted lower aryl group having from 6 to about 10 carbon atoms; and X is a halogen) and $R^2SiX_3$ (where $R^2$ is H, a lower alkenyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms or a substituted or unsubstituted lower aryl group having from 6 to about 10 carbon atoms). The Si—H containing organosilicon polymer is preferably selected from the group consisting of organopolysilanes of the formula $[(RSiH)_x(RSi)_y]_n$ (where R is a lower alkyl group having from 1 to about 6 carbon atoms, a lower alkenyl group having from 2 to about 6 carbon atoms, or a substituted or unsubstituted lower aryl group having from 6 to about 10 carbon atoms, and n is greater than 1), a polycarbosilane having repeat units of the formula $[R^aSi(H)—(CH_2)_q]$ (where $R^a$ is H, a lower alkyl group having from 1 to about 6 carbon atoms, a cycloalkyl group having from 3 to about 6 carbon atoms, or a substituted or unsubstituted lower aryl group having from 6 to about 10 carbon atoms, q is an integer 1 or greater), and a polysiloxane having repeat units of the formula $[R^bSi(H)O]_n$ (where $R^b$ is a lower alkyl group having from 1 to about 6 carbon atoms, a cycloalkyl group having from 3 to about 6 carbon atoms, or a substituted or unsubstituted lower aryl group having from 6 to about 10 carbon atoms, and n is an integer greater than 1).

Novel preceramic polymers formed by this method are also disclosed.

44 Claims, No Drawings

METHOD FOR CONVERTING ORGANOSILICON POLYMERS CONTAINING SIH REPEAT UNITS AND ORGANOPOLYSILAZANE PRECURSORS TO NEW AND USEFUL PRECERAMIC POLYMERS AND SILICON NITRIDE ENRICHED CERAMIC MATERIALS

The Government has rights in this invention pursuant to Contract Number N00014-82-K-0322 awarded by the Department of the Navy.

The present application is a continuation-in-part of U.S. patent application Ser. No. 781,934, filed Sept. 30, 1985, now U.S. Pat. No. 4,656,837.

The present invention relates to a process for preparing silicon-containing preceramic polymers useful for making silicon oxynitride, silicon carbide, and silicon nitride/silicon carbide ceramics and for their pyrolysis to such ceramic materials.

There is a great deal of interest in preceramic polymer materials, which can be pyrolyzed to yield silicon carbide, silicon nitride, silicon oxynitride and other silicon-based ceramic materials. R. W. Rice, *Amer. Ceram. Soc. Bull.*, 62: 889–892 (1983). Applications for such polymers include, among others:

1. formation into complex shapes and subsequent pyrolysis to give a ceramic material of the same shape;
2. spinning into continuous fibers whose subsequent pyrolysis yields ceramic fibers;
3. as a matrix material for carbon or ceramic fibers, or as a binder for ceramic powders (with subsequent pyrolysis to form a ceramic body);
4. oxidation-resistant coatings on otherwise oxidizable materials (such as carbon/carbon composites)—after the polymer coating is made, it can be pyrolyzed to give the resistant ceramic coating;
5. infiltration of porous ceramic bodies such as ones obtained from reaction-sintered silicon nitride by the polymer itself (if liquid) or by a solution of the polymer, with subsequent pyrolysis to form a ceramic, resulting in better strength, oxidation resistance, etc., of the body; and
6. formation of thin films of the ceramic material for electronics applications.

For instance, Penn et al., *J. Appl. Polymer Sci.*, 27: 3751–61 (1982) describe the preparation of silicon carbide-silicon nitride fibers from a polycarbosilazane precursor. Tris(N-methylamino) methylsilane monomer was formed by reaction of monomethylamine and methyltrichlorosilane in dry petroleum ether and a polycarbosilazane resin was formed by passing the monomer over glass Raschig rings at 520° C. The brittle polymer was soluble in methylene chloride and chloroform, etc. This product was spun into fibers, crosslinked in air and then pyrolyzed to give ceramic fibers.

Other polymer precursors for forming silicon carbide and silicon nitride ceramics have been described in U.S. Pat. Nos. 3,108,985; 3,853,567; 3,892,583; 4,310,651 and 4,312,970. These linear or crosslinked polymers and processes for producing ceramic materials have generally been found to be deficient in one or more ways.

S. Yajima, *Amer. Ceram. Soc. Bull.*, 62: 893–898; 903 (1983) discloses using $(CH_3)_2SiCl_2$ as a starting material for a preceramic polymer for the preparation of SiC-containing ceramics. The polymer of Yajima is prepared by sodium metal condensation of $(CH_3)_2SiCl_2$ to result in a polysilane, $-[(CH_3)_2Si]_n-$ (n is approximately 30). This polysilane can then form either a "Mark I" polymer or a "Mark III" polymer depending upon the treatment used. Heating in an autoclave under argon at 100 kPa at 450°–470° C. for 14 hours results in a Mark I polymer while adding a few percent of a polyborodiphenylsiloxane and heating under nitrogen at ambient pressure at 350° C. for 10 hours results in the Mark III polymer. In either case, the polysilicon backbone is converted to a polymeric chain in which the main repeat unit is:

The Mark I polymer also contains some $-[(CH_3)_2SiCH_2]-$ units. The Mark III polymer contains some Si—Si bonds in the form $-[(CH_3)_2Si-Si(CH_3)_2]_n-$ (n=2–8) units and a low percentage of $[(C_6H_5)_2SiO]$ units. These preceramic polymers can be processed to give ceramic fibers containing SiC, some free carbon and some $SiO_2$. However, there are problems associated with these polycarbosilane-derived ceramics. They have a tendency to crystallize below 1200° C., they have a $SiO_2$ content as a result of an oxidative cure step, and free carbon and a relatively low ceramic yield is obtained upon their pyrolysis for a commercial product. While the ceramic yield for the Mark III polymer is 68%, the yield for the Mark I polymer is only 54%.

Silicon oxynitrides are another important group of ceramics. This ceramic material has most of the same advantages as silicon nitride, but is expected to have a better oxidation stability. These are high refractory materials able to withstand temperatures up to about 1500° C. before decomposing. Although K. Okamura et al, *Chem. Lett.* (1984): 2059–2060 (See also K. Okamura et al, *Fifth Int. Conf. on Composite Materials,* July 29 –Aug. 1, 1985, Proceedings: 535–542) reported obtaining silicon oxynitride fibers after pyrolysis under ammonia, of $SiO_2$-containing polycarbosilanes (having $[CH_3Si(H)CH_2]$ as the major repeat unit), this was an expensive and inefficient process.

U.S. Pat. No. 4,482,669 issued Nov. 13, 1984, describes organopolysilazane preceramic polymers whose pyrolysis generally gives a mixture of silicon carbide and silicon nitride wherein, typically, neither component is in large excess over the other.

It would be useful to have a polymer precursor that is formed from readily available and relatively cheap starting materials, that is stable at room temperature, is soluble in organic solvents and whose pyrolysis can typically provide a high yield of ceramic products. It would also be useful to be able to form a ceramic material upon pyrolysis which contains substantially no free silicon, carbon or $SiO_2$.

SUMMARY OF THE INVENTION

We have now found that reaction of a metal amide or metal silylamide with an organosilicon polymer containing Si—H repeat units yields new polymeric organosilicon compounds which are useful preceramic materials. Upon pyrolysis these typically give ceramic yields significantly better than obtained for the original organosilicon polymer compound alone. In one preferred embodiment the metal amide is a polymeric silylamide which is the intermediate formed from the dehydrocyclodimerization reaction (DHCD) of the coammonolysis product of [R¹SiHX₂] and [R²SiX₃] (where R¹ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms; X is a halogen, preferably fluorine, chlorine, bromine or iodine; and R² is hydrogen, a lower alkyl group having from 1 to about 6 carbon atoms, a substituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms). This poly(silylamide) may be preformed and added to the Si—H containing organosilicon polymer. Alternatively, one may prepare the silylamide in situ, in the presence of the organosilicon compound.

The above polymeric silylamide is generated by treating the coammonolysis product of R¹SiHX₂ and R²SiX₃ (R¹ and R² are as defined above) with a basic catalyst capable of deprotonating the hydrogen from a nitrogen atom adjacent to a silicon atom also referred to as dehydrocylodimerization. With either preformed polysilylamide or an in situ silylamide procedure, the reaction mixture containing the organosilicon polymer having Si—H repeat units and the polysilylamide is stirred at room temperature and preferably heated at reflux in a suitable solvent such as tetrahydrofuran to complete the reaction. The resulting solution is then cooled and quenched typically with an organic halide or a silicon halide to produce the preceramic organosilicon polymers of the present invention. Preferably the organosilicon polymer is a polysilane compound of the formula $[(RSiH)_x(RSi)_y]_n$, (where $x+y=1$, n is an integer greater than 1, R is a lower alkyl group having from 1 to about 6 carbon atoms, a lower alkenyl group having from 2 to about 6 carbon atoms, a substituted or unsubstituted lower aryl group having from 6 to about 10 carbon atoms, or a tri(lower)alkyl- or di(lower)alkylsilyl group), a polycarbosilane polymer containing repeat units of the formula $[R^aSi(H)-(CH_2)_q]$, i.e.,

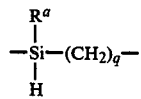
(II)

(where q is an integer 1 or greater $R^a$ is H, a lower alkyl group having from 1 to about 6 carbon atoms, a cycloalkyl group having from 3 to about 6 carbon atoms, a substituted or unsubstituted lower alkenyl group having from 2 to about 6 carbon atoms or a substituted or unsubstituted lower aryl group having from 6 to about 10 carbon atoms), or an organohydrogen-siloxane polymer containing repeat units of the formula $[R^bSi(H)O]_n$, i.e.,

(III)

(where n is an integer 1 or greater, $R^b$ is a lower alkyl group having from 1 to about 6 carbon atoms, a cycloalkyl group having from 3 to about 6 carbon atoms, a substituted or unsubstituted lower alkenyl group having from 2 to about 6 carbon atoms or a substituted or unsubstituted lower aryl group having from 6 to about 10 carbon atoms).

Aryl-substituted polymers of the type $[R^aSi(H)-(CH_2)_q]$, $[RSiH]_n$ and $[R^bSi(H)O]_n$ (e.g., where R, $R^a$ or $R^b$ is phenyl), react in the same way as the above described polycarbosilanes, organopolysilanes and polysiloxanes to give new polycarbosilane/organopolysilazane, organopolysilane/organopolysilazane and polysiloxane/organopolysilazane hybrid polymers, respectively.

The polymers formed by either basic method can then be pyrolyzed to yield ceramic materials in high yield.

DETAILED DESCRIPTION OF THE INVENTION

We have discovered that the reaction of a metal amide or silyamide with an organosilicon polymer containing Si—H repeat units (referred to as an Si—H containing organosilicon polymer) results in novel preceramic polymers. Most preferably, the metal amide is a polymeric alkali metal silylamide.

The Si—H containing organosilicon polymer is preferably a polysilane compound of the formula $[(RSiH)_x(RSi)_y]_n$, (where $x+y=1$, n is an integer greater than 1, R is a lower alkyl group having from 1 to about 6 carbon atoms, a substituted or unsubstituted lower alkenyl group having from 2 to about 6 carbon atoms, a substituted or unsubstituted lower aryl group having from 6 to about 10 carbon atoms, or a tri(lower)alkyl- or di(lower)alkylsilyl group) (See U.S. patent application Ser. No. 756,353 filed July 18, 1985), a polycarbosilane polymer containing repeat units of the formula $[R^aSi(H)-(CH_2)_q]$, i.e.,

(II)

(where q is an integer 1 or greater, $R^a$ is H, a lower alkyl group having from 1 to about 6 carbon atoms, a cycloalkyl group having from 3 to about 6 carbon atoms, a substituted or unsubstituted lower alkenyl group having from 2 to about 6 carbon atoms or a substituted or unsubstituted lower aryl group having from 6 to about 10 carbon atoms) (See U.S. patent application Ser. No. 781,934 filed Sept. 30, 1985), or an organohydrogensiloxane polymer containing repeat units of the formula $[R^bSi(H)O]_n$, i.e.,

(III)

(where n is an integer 1 or greater, $R^b$ is a lower alkyl group having from 1 to about 6 carbon atoms, a cycloalkyl group having from 3 to about 6 carbon atoms, a substituted or unsubstituted lower alkenyl group having from 2 to about 6 carbon atoms or a substituted or unsubstituted lower aryl group having from 6 to about 10 carbon atoms) (See U.S. patent application Ser. No. 849,390 filed Apr. 8, 1986).

In accord with the present invention, treatment of, for example, organopolysilanes with an alkali metal amide or silylamide will provide higher molecular weight preceramic materials and improve the ceramic yield.

The reaction of $CH_3SiHCl_2$ with an alkali metal will produce methylsilicon compounds of the formula $[(CH_3SiH)_x(CH_3Si)_y]_n$, where $x+y=1$; and n is an integer greater than 1 (hereinafter such compounds will be referred to as "methylpolysilanes"). The ceramic product obtained when this compound is pyrolyzed contains an excess of "free" silicon, rather than the ideal 1Si:1C composition. Further, depending upon the particular process used to obtain the methylpolysilane, other deficiencies can arise. A ceramic yield of less than 50% after pyrolysis typically represents an unacceptable preceramic polymer. Of the above described methylpolysilanes, those with $x=y$ which on pyrolysis gave a reasonable ceramic yield, had only a limited solubility in organic solvents, thus limiting further processing. Additionally, conversion of these polymers to ceramic fibers appear to require a photolysis-oxidation cure step. A methylpolysilane of the above-described formula, in which the crosslinking of the product is not as excessive ($x>y$) and, which is, therefore, more soluble in organic solvents, on the other hand provides an unacceptably low ceramic yield on pyrolysis, e.g., 12–27% in various runs. Consequently, alkali metal condensation of $CH_3SiHCl_2$ does not give a very useful preceramic polymer which can be used to form SiC and other Si/C ceramic materials.

We have now found that organopolysilanes such as the methylpolysilanes obtained in the above reactions, upon treatment with catalytic quantities of alkali metal amides or silylamides in accord with the present invention, yield preceramic polymers of higher molecular weight which upon pyrolysis give significantly higher ceramic yields. Such polymers, when prepared as described herein, are soluble in organic solvents. More preferably, one utilizes an alkali metal silylamide.

Polycarbosilane polymers that are used in the present invention preferably contain a multiplicity of repeat units of the formula $[R^aSi(H)—(CH_2)_q]$ (where q and $R^a$ are as defined above)(hereinafter polymers containing such repeat units are referred to as "polycarbosilanes"). The reaction of these polycarbosilanes with an alkali metal silylamide results in novel preceramic polymers. Typically, the pyrolysis of this new polymer gives a black ceramic solid in a yield that is greater than that obtained on pyrolysis of the parent polycarbosilane.

The polycarbosilane polymer should contain at least 25 mole % of repeat units of the formula II, i.e. $[R^aSi(H)—(CH_2)_q]$, in addition to other repeat units, such as $[R^a{}_2Si(CH_2)_q]$ (e.g. the Yajima polymers). Preferably the polycarbosilane polymer contains at least 35 mole % of repeat units of formula II. More preferably, the polymer contains at least 50 mole % repeat units of formula II.

The polymer may also contain a mixture of repeat units of the above described formula, e.g., both $[R^aSi(H)—(CH_2)_q]$ and $[R^{a'}Si(H)—(CH_2)_{q'}]$ ($R^{a'}$ and $q'$ are defined the same as $R^a$ and q, respectively, but $R^{a'}$ may be different than $R^a$ and $q'$ may be different than q). $R^a$ is preferably a lower alkyl group, more preferably $R^a$ is $CH_3$. Preferably q is equal to 1–3, more preferably it is equal to one.

The polycarbosilane and silylamide are typically added in a weight ratio of polycarbosilane: silylamide of about 10:1 or less. Preferably this ratio is about 5:1 or less. More preferably the ratio is about 3:1 or less. Most preferably the ratio is about 1:1.

Additionally, the reaction of organohydrogensiloxane polymers containing a plurality of repeat units of the formula $[R^bSi(H)O]_n$ (where n and $R^b$ are as defined above) (hereinafter polymers containing such repeat units are referred to as "polysiloxanes"), with a poly(silylamide) also results in a novel preceramic polymer.

The pyrolysis of this new preceramic polymer under a stream of ammonia typically results in a high yield of a white ceramic material. By choosing the correct stoichiometry one is readily able to obtain a ceramic material that is virtually only silicon oxynitride. This process provides silicon oxynitrides at high yield and at low costs. The pyrolysis of the preceramic polymer of the present invention under an inert atmosphere such as nitrogen or argon typically results in a black ceramic solid in high yield. This black ceramic material generally contains SiC, $Si_3N_4$ and $SiO_2$ and can be used as a binder or coating.

The polysiloxane polymer used in the present invention can be readily obtained by the hydrolysis of the appropriate $R^bSiHCl_2$ (where $R^b$ is as defined above). The hydrolysis may be steered to give a high yield of cyclic $[R^bSi(H)O]_n$ oligomer or to produce higher molecular weight linear $[R^bSi(H)O]$ polymers. They yield of cyclic oligomers (n=4, 5, 6, ... ) may be maximized by using the method taught by Seyferth, D., Prud'homme, C; and Wiseman, G. H., *Inorg. Chem.*, 22: 2163-2167 (1983). Additionally, one can use commercially available $[R^bSi(H)O]_n$ polymers.

The polysiloxane polymers useful in the present invention encompass polymers having a wide range of $[R^bSi(H)O]$ repeat units. The number of repeat units contained in the polymer will vary depending upon the desired end product.

Preferably, the polysiloxane polymer should contain at least 25 mole % of repeat units of the formula III, i.e. $R^bSi(H)O]_n$, in addition to other repeat units, for example, $[R^bR^{b'}SiO]$, $[R^{b'}R^{b''}SiO]$, $R^{b'}$ and $R^{b''}$ are defined the same as $R^b$; and $R^b$, $R^{b'}$, and $R^{b''}$ may be the same as or different from each other. More preferably the polysiloxane polymer contains at least 35 mole % of repeat units of formula III. Even more preferably, the polymer contains at least 50 mole % repeat units of formula III. Most preferably, the polymer contains at least 75% mole repeat units of formula III.

In a preferred embodiment, the polymeric silylamide used is the intermediate formed from the dehydrocyclodimerization reaction (DHCD) of the coammonolysis product of $[R^1SiHX_2]$ and $[R^2SiX_3]$ (wherein $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms; X is a halogen; $R^2$ is hydrogen, a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms). These polysilylamide compounds have been described in U.S. patent application Ser. No. 899,471 filed Aug. 22, 1986 which is incorporated herein by reference. This patent application describes the formation of novel preceramic polysilazanes by treatment of the coammonolysis product of, for example, $CH_3SiHCl_2$ and $HSiCl_3$ with catalytic quantities of a base, for example, KH in organic solvents, for example, tetrahydrofuran, THF. After these compounds are treated with an electrophile such as methyl iodide, $CH_3I$, preceramic polymers are obtained. Prior to the addition of $CH_3I$, a reactive "living" polymer intermediate is obtained. This intermediate species can react with electrophiles other than $CH_3I$, e.g., with diverse chlorosilanes. Pyrolysis of the $CH_3I$-treated polysilazanes typically yields a ceramic material containing primarily $Si_3N_4$, some SiC and "free" carbon.

$R^1$ is preferably a lower alkyl group more preferably $CH_3$, while $R^2$ is preferably H or a lower alkyl group, more preferably H or $CH_3$. X is preferably chlorine, fluorine, bromine or iodine. The dihalosilane can be added to the trihalosilane over a wide range, but preferably the mole ratio of $R^1SiHX_2:RSiX_3$ is about 20:1 to 1:20, more preferably it is from about 8:1 to about 1:6, still more preferably about 8:1 to about 1:2, and even more preferably from about 6:1 to about 1:1.

This silylamide when pyrolyzed will typically produce a ceramic material that is richer in silicon nitride than that obtained on pyrolysis of the polysilazane DHCD product obtained from the corresponding dihalosilane alone.

The use of the above polymeric silylamide in one embodiment of the present invention upgrades the Si—H containing organosilicon polymer, for example, the organopolysilanes, the polycarbosilanes and the polysiloxanes to new polymers which give a high ceramic yield on pyrolysis. When this silylamide is reacted with an Si—H containing organosilicon polymer the reaction product after treatment with a suitable electrophile such as an organic or a silyl halide, incorporates both starting materials. When this reaction product is pyrolyzed, the ceramic yield is significantly greater than that of the "parent" organosilicon polymer. Additionally, the silicon nitride/silicon carbide ratio of the resulting material can be varied depending upon the particular dihalosilane and trihalosilane, ratio of dihalosilane to trihalosilane and Si—H organosilicon polymer used. The ratios to use to obtain a particular result can be determined empirically by the skilled artisan based upon the present disclosure.

The weight ratio of Si—H containing polymer to polymeric silylamide can vary widely. For example, mole ratios of organopolysilane: polymeric silylamide from about 4:1 to about 1:4, and preferably from 2.5:1 to 1:2 typically provide useful results. Weight ratios of polycarbosilane: polymeric silylamide from about 10 to about 1; and preferably from 5:1 to 1:1 typically provide useful results. Weight ratios of polysiloxane: polymeric silylamide of 1:1 and 1:5 typically provided useful results. Weight ratios of polysiloxane: polymeric silylamide from about 15 to about 1 to about 1 to about 15, should also provide useful results. Preferably the weight ratio of polysiloxane: polymeric silylamide ranges from about 5:1 to 1:5, and more preferably, from 5:1 to 1:1. However, in all three cases other ratios can be used depending on the particular starting materials and their pyrolysis characteristics.

The organosilicon polymers thus formed by reaction of the organosilicon polymer containing Si—H repeat units with the preformed silylamide "living intermediate" followed by treatment with an electrophile, henceforth will be referred to as "graft" polymers.

Polysilanes of type $(RSiH)_n$ (i.e., the general case where y=0, x=1) also react with the polymeric silylamides that are the DHCD reaction product of the coammonolysis of a dihalosilane and trihalosilane. Thus, a reaction of $(C_6H_5SiH)_n$ with the silylamide "living intermediate" (1:1 molar ratio) in THF at room temperature gives a new organosilicon polymer which is an effective ceramic precursor, giving a $Si_3N_4/SiC/C$ ceramic product in high yield upon pyrolysis to 1000° C.

Additionally, use of the reaction product of organopolysilanes or polycarbosilanes with the polymeric silylamide results in a product that is self-curing as the temperature is raised in the production of ceramic material. Consequently, with these polymers it is possible to avoid the formation of $SiO_2$ which results when an oxidative cure step is used. This again is an improvement over pyrolysis of the precursor silane compound alone.

In this system, R or $R^a$ is preferably a lower alkyl, more preferably, R or $R^a$ is $CH_3$. However, R or $R^a$ need not be the same and, as aforesaid, mixtures of Si—H containing organosilicon compounds and/or repeat units, e.g., $[(RSiH)_x(RSi)_y]_n$ and $[(R''SiH)_{x'}(R'\text{-}Si)_{y'}]_{n'}$, $[R^aSi(H)—(CH_2)_q]$ and $[R^aSi(H)—(CH_2)_{q'}]$, and $[(RSiH)_x(RSi)_y]_n$ and $[R^aSi(H)—(CH_2)_q]$ can be used to obtain further flexibility in tailoring the properties of the aforesaid product. Similarly, mixed polymers of the type $[(RSiH)_a(RSi)_b(RR'Si)_c]_m$ (where a, b, c, m and R are as defined above, and R' is defined as is R above and R' may be the same or different than R) can be used as well. Preferably, at least one of the grouping R, R', $R^a$, and $R^{a'}$ for each mixture is $CH_3$.

The polysiloxane polymer may also contain a mixture of repeat units of the above described formula, e.g., both $[R^bSi(H)O]$ and $[R^{b'}Si(H)O]$ ($R^{b'}$ is defined the same as $R^b$ but $R^{b'}$ may be different than $R^b$). $R^b$ is preferably a lower alkyl group, more preferably $R^b$ is $CH_3$. Further, these aforesaid mixtures of compounds can be used to obtain additional flexibility in tailoring the properties of the aforesaid product.

Mixtures of polysilazanes, for example where $R^2$ is H and $R^{2'}$ is $CH_3$ also may be used.

As indicated above, this invention also includes the case of $[(RSiH)_x(RSi)_y]_n$, where x=1, y=0, with R as defined above. Thus, $[(RSiH)]_n$ may be a linear or a mixture of cyclic species, or a hybrid of both types. For example, $[PhSiH]_n$ (Ph is a phenyl group), cf, Aitken, C. et al., J. Organomet. Chem., 279:C11–C13 (1985), reacts in the same way as the above-described organopolysilanes to provide new organopolysilane/organopolysilazane hybrid polymers. These mixtures will be particularly useful in attempts to avoid excess free silicon or carbon. Similarly, aryl-substituted repeat units of either $[R^aSi(H)—(CH_2)_q]$ or $[R^bSi(H)O]$, for example, where $R^a$ or $R^b$ is a phenyl or substituted phenyl group, and $R^a$ and $R^b$ can be a lower aryl group is also included.

The preceramic product one obtains by using these silylamides, even in only catalytic amounts, differs from the starting organosilicon compound. This difference in products apparently arises because both Si—H and Si—Si bonds are reactive towards nucleophilic reagents.

The "graft" polymer is formed by combining the already formed polymeric silylamide with the Si—H containing organosilicon polymer, for example, the organopolysilane in varying proportions in an organic solvent. Thereafter, the mixture is stirred at room temperature for sufficient time for the two compounds to react. In one embodiment, the polysiloxane, for example, [CH$_3$Si(H)O]$_n$ oligomers with a high cyclic content, is added slowly to an organic solution such as THF containing the preformed silylamide. An immediate reaction with some gas evolution occurs. Thereafter, the mixture is stirred at room temperature for sufficient time for the two compounds to more completely react.

Any organic solvent in which both polymer systems are soluble without reaction can be used. Such organic solvents include, for example, THF, diethyl ether, glycol ethers, alkanes, arenes and combinations thereof. The mixture may be heated above room temperature, and can be refluxed to speed up the completion of the reaction. After refluxing, the mixture is quenched with an electrophile, E-X$^1$ to form the organosilicon "graft" polymer. The electrophile can be an alkyl halide, sulfate, or sulfonate; a halosilane; or the like. Typically, CH$_3$I or a chlorosilane is used, although other equivalent electrophiles well-known to those skilled in the art can also be used. E is preferably a lower alkyl group or silyl group; X$^1$ is preferably a halide, sulfate or sulfonate.

The organosilicon polymer formed by the present ("graft") process with the organopolysilane is typically obtained in yields greater than 85% based on weight of the starting materials with a variable molecular weight, typical values being in the 1600–2200 g/mol range. This preceramic organosilicon polymer can then by pyrolyzed under inert atmosphere conditions (As used herein, nitrogen will be considered an inert gas, argon is another example) to result in a ceramic material in high yield. Pyrolysis under nitrogen gave ceramic products in a yield of 75–85%.

The organosilicon preceramic polymers formed by the present ("graft") process when polycarbosilane is used were produced in high yields (as high as 95%). Pyrolysis of this preceramic polymer gave ceramic products in a yield of 75–85% (based on weight of the starting materials).

The resultant preceramic polymer when polysiloxane was used were produced in good yields, typically better than 70%. The Polysiloxane-derived preceramic organosilicon polymers can then by pyrolyzed under nitrogen or other inert atmosphere to result in ceramic materials in high yield. Typically, pyrolysis under nitrogen gave black ceramic products in a high yield (as high as 88%). More significantly, pyrolysis under ammonia will give a white ceramic solid in high yield. The white ceramics contain little, if any, carbon.

What is referred to herein as an "in situ" polymer can be obtained by carrying out the DHCD reaction of the dihalosilane and trihalosilane coammolysis product in solution in the presence of the Si—H containing organosilicon polymer. In this method, the organopolysilane or polycarbosilane is added to an organic solvent. Afterwards, the mixture (generated by reacting in solution anhydrous ammonia with the dihalosilane and trihalosilane) is added. The polysiloxane is added to the coammonolysis mixture which is in an organic solvent.

One then adds to the solution a basic catalyst capable of deprotonating the hydrogen from a nitrogen atom adjacent to a silicon atom. See U.S. Pat. No. 4,482,669. The reaction mixture gradually changes color and hydrogen is evolved. The resulting solution is then stirred at room temperature for sufficient time for the silylamide and the Si—H containing organosilicon polymer to react. It can be heated above room temperature, and can be heated at reflux to speed the completion of the reaction. Afterwards, the reaction mixture is allowed to cool to room temperature, if required, and quenched with an electrophile such as CH$_3$I or a halosilane, such as a chlorosilane, to produce the organosilicon "in situ" polymer. The molecular weight of the "in situ" polymer is variable. On pyrolysis this material provides a high yield of a black ceramic material.

On pyrolysis the polycarbosilane-derived material provides a yield of a black ceramic material, that is typically greater than that obtained on pyrolysis of the polycarbosilane alone.

On pyrolysis under nitrogen or argon the polysiloxane-derived material provides a yield of a black ceramic material, that is typically greater than that obtained on pyrolysis of the polysiloxane alone. Pyrolysis under ammonia typically results in silicon oxynitrides in high yields.

The organosilicon polymer formed by either of the above "graft" or "in situ" methods usually is separated from solution. The solvent is removed by using techniques well known to a person of ordinary skill in the art. One standard method is distillation, preferably trap-to-trap distillation. The polymer, typically a white powder that is soluble in an organic solvent, is thereby obtained. One may also combine trap-to-trap distillation with centrifuging, followed by trap-to-trap distillation to separate the polymer from solution.

The "in situ" preceramic polymer differs physically from the "graft" preceramic polymer. Major differences will be observed in their proton NMR spectra and in the form of their thermogravimetric analysis (TGA) curves. Both types of polymers are useful as preceramic materials.

The use of coammonolysis-derived, DHCD-catalyzed silylamide described herein not only improves the ceramic yield of the organopolysilanes, but, more significantly, when this silylamide is reacted with organopolysilane of the formula [(RSiH)$_x$(RSi)$_y$]$_n$ in the appropriate stoichiometry, the reaction product of [(RSiH)$_x$(RSi)$_y$]$_n$ and the "living intermediate" silylamide after treatment with a suitable electrophile such as an organic or a silyl halide, incorporates both starting materials. When this reaction product is pyrolyzed, the excess silicon normally obtained in the pyrolysis of the organopolysilane alone and the excess carbon normally obtained in the pyrolysis of the quenched polymeric silylamide alone combine so that there is no substantial excess of either element in the ceramic product. Consequently, one can obtain a ceramic material preferably with less than about 1% free silicon or free carbon, more preferably less than about 0.5% free carbon and less than 0.5% free silicon, and most preferably with less than about 0.1% of free silicon and less than about 0.1% of free carbon, i.e., a ceramic material containing substantially no free carbon and no free silicon. The exact combination of the two compounds necessary to result in the desired stoichiometry can readily be calculated by a person of ordinary skill in the art on the basis of the results of the analyses of the ceramic products obtained in the pyrolysis of the separate polymers. Mole ratios of organopolysilane: metal silylamide from about 4:1 to about 1:4, and preferably from 2.5:1 to 1:2 should provide useful results. However, other ratios can be used depending on the particular starting materials and their pyrolysis characteristics.

The excess of free carbon, which can be a problem with the starting polycarbosilanes, can be dealt with by using a ternary system of: (1) the polycarbosilane; (2) the polysilazane (as the polymeric silylamide, either preformed or generated in situ) and (3) a polysilane whose pyrolysis alone gives a ceramic product which contains an excess of silicon. Examples of such polysilanes are organopolysilanes as described above, for example, those which are produced by the sodium condensation of methyldichlorosilane. In these reactions the organopolysilane is preferably as defined above, i.e. $[(RSiH)_x(RSi)_y]_n$. More preferably R is a lower alkyl group, most preferably R is $CH_3$. Using an appropriate mixture of the three polymers (which can be calculated from the results of the analyses of the ceramic products of the pyrolysis of each individual polymer, e.g. the $CH_3I$-quenched polymer in the case of the polymeric silylamide), one can obtain a ceramic product which contains a minimal excess of either element, carbon or silicon. Such hybrid ternary preceramic polymers are soluble in organic solvents and, depending on component ratios used, are of variable molecular weight. Their pyrolysis gives black ceramic products in high (generally >80%) yield.

In the preceramic polymer which results from a combination of a polysiloxane polymer (A) and an alkali metal (poly)silylamide (B), the ratio of Si/O/N of the resultant ceramic material can be broadly varied by adjusting the stoichiometry of the preceramic polymer, i.e. the A:B ratio. For example, at one extreme, the pyrolysis of a $CH_3I$-quenched silylamide derived from the coammonolysis of $CH_3SiHCl_2$ and $HSiCl_3$ and subsequent DHCD reaction under a $NH_3$ atmosphere produced white silicon nitride. By appropriate selection of reactant stoichiometry it should be possible to obtain a ceramic product that is virtually pure silicon oxynitride.

For example, it should be possible to obtain distinct crystalline phase $Si_2ON_2$ after pyrolysis under a stream of ammonia from a preceramic polymer one obtains by the in situ process. In this instance the weight ratio of polysiloxane:alkali metal poly(silylamide) is about 1:1 and R and $R^1$ are $CH_3$ and $R^2$ is H or $CH_3$. In the above-described system, deviating from a 1:1 ratio results in a ceramic polymer having some $Si_3N_4$ when you use more poly(silyamide) or some $SiO_2$ when you use more polysiloxane. It is simple to empirically determine the appropriate weight ratio for a desired ceramic product with the use of any of the claimed starting materials.

The polysiloxane and silylamide are typically added in a weight ratio of polysiloxane: silylamide from 15:1 to 1:15. Preferably this ratio is about 5:1 to 1:5. More preferably the ratio is about 3:1 to 1:3. Most preferably the ratio is about 1:1.

Physical blends of Si—H containing organosilicon polymers, for example the organopolysilane, the polycarbosilane polymers containing repeat units of $[R^a$-$Si(H)-(CH_2)_q]$, for example, the Yajima polycarbosilane or the polysiloxane containing repeat units of $[R^bSi(H)O]_n$, with the "quenched" organosilazane polymer of U.S. patent application Ser. No. 899,471 can be used since these will react when they are heated together. When approximately equal molar quantities of the polymers where R, $R^a$ or $R^b = CH_3$, $R^1 = CH_3$, R=H or $CH_3$, are mixed and finely ground together and then subjected to pyrolysis to 1000° C., ceramic yields are obtained which are approximately the average of the ceramic yields when the organopolysilane and the organosilazane polymers are pyrolyzed separately, are significantly higher than that which results when the polycarbosilane is pyrolyzed separately and is still higher than that which results when the polysiloxane is pyrolyzed separately.

When polycarbosilane/organosilazane mixtures are heated, in the absence of a solvent at 200° C. under nitrogen, white foamy solids are obtained which are insoluble in nonpolar organic solvents. When organosilane/organosilazane mixtures are heated, either in the absence of a solvent at 100° C. under nitrogen or in a toluene solution at reflux, white powders are obtained which are insoluble in nonpolar organic solvents.

Ternary blends of the polycarbosilane, the polysilazane and the $[(CH_3SiH)_x(CH_3Si)_y]_n$ polysilane behave similarly.

The combined polymers obtained by the "graft," "in situ" and physical blend methods can be converted to black ceramic fibers. Pyrolysis of pressed bars of the combined polymers to 1000° C. provides a black solid product. In other experiments, silicon carbide powder is dispersed in a toluene solution containing 25% by weight of the combined organosilane/organosilazane polymers. The solvent is evaporated and the residue, a fine powder of silicon carbide with combined polymer binder is pressed into bars and pyrolyzed at 1000° C. A ceramic bar is obtained showing a low weight loss and slightly shrunken size.

Similarly, when silicon carbide powder is dispersed in toluene solutions of the combined polycarbosilane/organosilazane polymers, the solvent evaporated and the residue, a fine powder of silicon carbide with combined polymer binder, is pressed into bars and pyrolyzed at 1000° C., a ceramic bar is obtained showing a low weight loss and slightly shrunken size.

Pyrolysis of bars of the combined polysiloxane-organosilazane polymers under ammonia results in a white rectangular body. Pyrolysis under either pyrolysis condition results in ceramic bars showing low to moderate weight loss and slightly shrunken size.

The invention will be further illustrated by the examples that follow:

I. General

All reactions and manipulations were carried out under a dry nitrogen atmosphere using standard Schlenk techniques or a Vacuum Atmospheres dry box. All solvents were distilled under nitrogen: diethyl ether and tetrahydrofuran from sodium benzophenone ketyl, and hexane from lithium aluminum hydride. Chlorosilanes were obtained from Petrarch Systems, Inc. or Silar Labs., Inc. and were distilled from magnesium filings prior to use. Anhydrous ammonia (Matheson) was dried by passing through a KOH-filled drying tube. Methyl iodide was distilled under nitrogen from $P_2O_5$. Potassium hydride (Alfa) was obtained as a 40% slurry in mineral oil which was filtered, washed with hexane and dried prior to use.

Proton NMR spectra were obtained on either a Jeol FX-90Q (90 MHz) or a Bruker WM-250 (250 MHz) using a $CDCl_3$ reference (7.24 ppm shift). Infrared spectra were obtained on a Perkin-Elmer Model 1430 infrared spectrophotometer.

Molecular weights were determined by cryoscopy in benzene.

Thermogravimetric analysis (TGA) yields were obtained using a Perkin-Elmer TGS-2 system. Samples were heated from 50° C. to 950° C. under an argon atmosphere at 10° C./min. Large-scale tube furnace pyrolyses to produce gram quantities of ceramics were performed in a Lindberg Model 59344 tube furnace with controller. Samples were heated from 200° C. to 1000° C. at 10° C./minute in an argon atmosphere. Analyses of all oils and polymers were performed by Scandinavian Microanalytical Labs, Herlev, Denmark. Ceramic analyses were performed by Galbraith Labs, Knoxville, Tenn.

II. Coammonolysis Reactions

A typical reaction is described. All other ammonolyses of the $RSiCl_3$ alone or of mixtures of $CH_3SiHCl_2$ with $RSiCl_3$ ($R=H$, $CH_3$, $CH_2=CH$) were carried out using the same general procedure. For each $CH_3SiHCl_2/RSiCl_3$ molar ratio used, separate reactions were carried out in $Et_2O$ and in THF medium.

A 1000 ml three-necked round-bottomed flask equipped with a Dry Ice condenser, an overhead mechanical stirrer and a rubber septum was flame-dried while a stream of dry nitrogen was passed through. Dry diethyl ether (600 ml) was added and then 33.6 g (0.292 mol) of $CH_3SiHCl_2$ and 6.8 g (0.05 mol) of $HSiCl_3$. The solution was cooled to 0° C. (ice bath). The original septum was replaced with another septum through which a one-foot gas inlet tube passed. Gaseous ammonia then was bubbled into the solution at a moderate rate for 4.5 hours until ammonia was observed condensing on the −78° C. condenser. The ammonia inlet tube was replaced with a rubber septum after the addition of ammonia had been stopped.

The reaction mixture was allowed to warm to room temperature and stirred under nitrogen overnight. Filtration (in the dry box) removed $NH_4Cl$ and any other insoluble products of the reaction. The solids were washed with three 50 ml portions of ether. Trap-to-trap distillation of the solvent (25° C., 0.1 mm Hg) from the combined ether phases left a clear, mobile oil (15.0 g, 74% based on the $(CH_3SiHNH)$ and $[HSi(NH)_{1.5}]$ components). The oil was characterized by analysis, by IR and $^1H$ NMR spectroscopy. The molecular weight was measured (cryoscopy in benzene) and a thermogravimetric trace was obtained (50°–950° C. 10° C. per minute).

$^1H$ NMR (250 MHz, in $CDCl_3$): $\delta 0.17$ (broad m, 2.6 H, $CH_3Si$), 0.85 (broad m, 1.3, NH), 4.37 (broad s, 0.25 H, SiH), 4.63 (broad s, 0.41 H, SiH) and 4.81 (broad s, 0.33 H, SiH).

IR (thin film, $cm^{-1}$): 3380 (s), 2960(s), 2900(w), 2140–2120 (broad,s), 1545(w), 1405(m), 1255(s), 1200–1150 (broad, vs), 980–750 (broad, vs).

MW: 390 g/mol.

TGA: 33% by weight ceramic residue, black solid.

Anal. (Based on NMR-derived formula $[CH_3SiHNH][HSi(NH)_{1.4}]_{0.17}$). Calcd for $CH_{5.41}N_{1.24}Si_{1.17}$, C, 17.7; H, 8.05; N, 25.7. Found: C, 17.75; H, 7.53; N, 25.80.

III. Preparation of Organosilicon Compounds

1. Preparation of $[(CH_3SiH)_x(CH_3Si)_y]_n$ (all operations under nitrogen)

a. In THF Medium

A 500 ml, three-necked, round-bottomed flask equipped with a stir-bar, a dropping funnel and a reflux condenser was charged with 50.5 g (2.20 g atom) of Na metal. The flask was attached to a Schlenk manifold, evacuated and refilled with nitrogen three times. THF (200 ml) was added and the dropping funnel was charged with 65 ml (0.625 mol) of $CH_3SiHCl_2$. The silane was added to the stirred Na suspension during the course of 45 min., after which time the reaction mixture was cloudy and slightly warm. The mixture was stirred for 16 hours at room temperature and 48 hours at reflux; it then was cooled to room temperature. Hexane (60 ml) was added. The mixture was transferred by cannula to a heavy-walled centrifuge bottle and centrifuged. The supernatant layer was transferred to a 1 liter round-bottomed flask (under nitrogen). THF (50 ml) and hexane (30 ml) were added to the residual solid and the resulting suspension was centrifuged. The supernatant layers were combined and solvents were removed by trap-to-trap distillation in vacuum until the residual liquid volume was about 100 ml. This liquid was cannulated into a 250 ml single-necked flask and the remaining solvent was removed in vacuo to leave 13.2 g (0.30 mol, 48% yield) of a white, glassy solid. On being heated in a sealed capillary (in vacuo) this solid softened around 40° C. and "melted" between 130°–140° C. with gas evolution, leaving a thick gum. There was no further change up to 300° C. except for a gradual increase in viscosity. The product was poorly soluble in hexane, only somewhat soluble in benzene (precluding measurement of its cryoscopic molecular weight in this solvent) and quite soluble in THF. NMR (90 MHz, in $CDCl_3$): $\delta 0.10–0.61$ (m, $SiCH_3$, 7.5H) and 3.55–3.90 (m, SiH, 1H). Based on the reasonable assumption that every Si atom bearing a H substituent also bears a $CH_3$ substituent, the integrated $CH_3Si$ and SiH intensities lead to a constitution $[(CH_3SiH)_{0.4}(CH_3Si)_{0.6}]_n$.

Anal. Calcd for $CSiH_{3.4}$: C, 27.60; H, 7.87. Found: C, 27.18; H, 7.17.

IR (KBr, Nujol): 2170(sh), 2100(s, Si—H), 1408(m), 1260(m, Si—$CH_3$), 1249(s, Si—$CH_3$), 1060(br), 1019(s), 931(s), 865(vs, Si—$CH_3$), 770(vs), 685(vs), $cm^{-1}$.

TGA(25°–1000° C., 10° C./min.): 60% yield of a gray-black ceramic solid. A tube furnace pyrolysis of 3.20 g of this material to 1500° C. gave 1.52 g 48%) of a gray ceramic powder.

Anal. of the Ceramic Powder Found: C, 22.56; Si, 78.42; H, 0.01; N, 0.009%. (SiC requires C, 29.94; Si, 70.06%; actual composition: SiC+0.49 Si). X-ray powder diffraction ($d_o$, Å): 1.315(s) ($\beta$—SiC), 1.542(s) ($\beta$—SiC), 1.91(m) (Si), 2.181(m), ($\beta$—SiC), 2.52(vs) ($\beta$—SiC), 3.13(m) (Si).

A mass spectral analysis of the pyrolysis gas in another experiment showed the following: no gaseous products were observed up to 385° C., then fragment ions corresponding well with the reported fragmentation of $CH_3SiH_3$. At 445° C., $CH_3SiH_3$ was still observed and a peak at m/z=16 ($CH_4$) began to grow in. By 580° C., when weight loss was about over, only the methane peak was observable.

b. In Hexane/THF Medium

In a dry box, a 1 liter three-necked, round-bottomed flask equipped with a stir-bar, a dropping funnel and a reflux condenser was charged with 75.0 g (3.26 mol) of sodium metal. The flask was attached to a Schlenk manifold, evacuated and flushed with nitrogen. THF (70 ml) and hexane (420 ml) were added and the dropping funnel was charged with 150 ml (1.44 mol) of methyldichlorosilane. Methyldichlorosilane was added slowly into the flask over a 3 hour period. The reaction solution turned purple and by the end of the addition was at gentle reflux. The reaction mixture was stirred at room temperature for 2 hours and then heated at reflux for 16 hours. After it had been cooled to room temperature, the reaction mixture (except for the large NaCl crystals) was transferred via cannula into a heavy-walled glass bottle. The mixture was centrifuged and the clear, colorless supernatant layer transferred by cannula into a 1 liter round-bottomed flask equipped with a stir-bar. Hexane (200 ml) and THF (20 ml) were added to the remaining solids, the mixture again was centrifuged, and the supernatant liquid combined with the supernatant solution previously separated. Solvent was removed by trap-to-trap distillation until the volume of the residue was about 100 ml, and the remaining liquid was transferred by cannula into a weighed 250 ml round-bottomed flask. Remaining solvent was removed by trap-to-trap distillation at approximately 0.05 mm Hg at room temperature to give 51.2 g (81%, 1.16 mol) of a cloudy white oil.

$^1$H NMR (90 MHz, $C_6D_6$): $\delta 0.37$ (broad, $SiCH_3$, 3.74H) 3.92 (broad, SiH, 1 H).

NMR integration of the product gave a constitution of $[(CH_3SiH)_{0.8}(CH_3Si)_{0.2}]_n$.

IR (thin film, cm$^{-1}$): 2967(s), 2900(s), 2800(w), 2099(vs), 1410(s), 1385(w), 1249(s), 1055(br), 933(s), 865(vs), 770(vs), 685(br), 650(sh), 585(w).

Molecular weight (cryoscopic in benzene): 600 g/mol.

Anal. (material from another similar preparation). Calcd. for $CSiH_{3.76}$: C, 27.39; H, 8.55; Si, 64.05. Found: C, 27.49; H, 8.98; Si, 61.58%.

TGA (25°-1000° C., 10° C./min): 20% yield of a gray-black ceramic solid. Pyrolysis of a sample from another preparation in a tube furnace gave a gray-black ceramic solid in 36% yield (by weight).

Anal. of Ceramic. Found: C, 22.93; Si, 75.99%.

The pure liquid obtained by this procedure is very air-sensitive, particularly when its effective surface area is high, as when in contact with a fritted funnel or a paper or cloth towel (in which cases spontaneous inflammation may occur).

Other, similar reactions have given 62-75% yields of $(CH_3SiH)_x(CH_3Si)_y$. Molecular weight determinations of several preparations ranged from 520-740 g/mol. All products had very similar $^1$H NMR spectra, but with different $SiCH_3$:SiH ratios. Physical data of these products are listed in Table 1.

TABLE 1

| PHYSICAL DATA FOR $[(CH_3SiH)_x(CH_3Si)_y]_n$ POLYMERS | | | | | | |
|---|---|---|---|---|---|---|
| Sample # | Polymer Yield (%) | M.W.[a] | $SiCH_3$:SiH[b] | Ceramic[c] Yield (%) | x | y |
| YFY III-1 | 81 | 600 | 3.74:1 | 20 | 0.80 | 0.20 |
| YFY II-40 | 74 | 740 | 3.56:1 | 16 | 0.84 | 0.16 |
| YFY II-25 | 73 | 650 | 3.51:1 | 26 | 0.85 | 0.15 |
| YFY II-12 | 66 | 520 | 3.27:1 | 16 | 0.91 | 0.09 |
| YFY I-73 | 73 | 680 | 3.48:1 | 27 | 0.86 | 0.14 |

[a]Cryoscopic in benzene.
[b]$^1$H NMR integration ratio.
[c]Under nitrogen gas, 25-1000° C., 10° C./min (TGA)

For the purpose of simplifying calculation, an average formula weight value 44 was assigned for the unit $(CH_3SiH)_x(CH_3Si)_y$. Therefore, in each of the following experiments, the number of moles of the reaction unit ($CH_3SiH$) was calculated from the weight of the polymer used divided by 44.

The product formed in the THF solution gives a 60% ceramic yield, but it is of limited solubility in organic solvents and its conversion to ceramic fibers requires a curing step of photolysis/oxidation. Preparation of the $[(CH_3SiH)_x(CH_3Si)_y]_n$ in a hexane/THF mixture of approximately 6 to 7:1 resulted in satisfactory yields of a soluble product. However, pyrolysis of this material resulted in very low ceramic yields, ranging from 16 to 27%.

2. Characterization of the Polycarbosilane

The polycarbosilane, a white solid, was purchased from Dow Corning Corporation. The following data were collected on it:

$^1$H NMR (90 MHz, $C_6D_6$): $\delta 4.52$ (broad, SiH, 1H) 0.26 (broad, $SiCH_3$ and $SiCH_2Si$, 8.6H).

IR (KBr, Nujol, cm$^{-1}$): 2104(s), 1253(s), 1014(s, broad), 845(s, broad), 734(s).

Molecular Weight (cryoscopic in benzene): 1210 g/mol.

TGA (25°-1000° C., 10°- C./min): 58% yield of a black ceramic solid.

$T_{\frac{1}{2}} = 510°$ C.

3. Preparation of Siloxanes a. Preparation of $CH_3Si(H)O]_n$(IV-31)

A 500 ml three-necked, round-bottomed flask equipped with a stir-bar, a reflux condenser, and a serum cap was charged with 90 ml (0.87 mol) of $CH_3SiHCl_2$ and 250 ml of $CH_2Cl_2$. To the solution was added slowly (syringe pump) 20 ml (1.11 mol) of $H_2O$ over a two hour period. The reaction mixture was stirred at room temperature for 24 hours. Eight 100 ml portions of $H_2O$ were added to the reaction mixture. The $CH_2Cl_2$ layer was washed with two 100 ml portions of $H_2O$ and dried over $MgSO_4$. The solvent was removed by rotary evaporation to give 44.5 g (85% yield based on ($CH_3Si(H)O$) unit) of a clear oil.

$^1$H NMR (90 MHz, $C_6D_6$): $\delta 4.71$, 4.69 (broad, SiH, 1 H) 0.23, 0.21 (broad, $SiCH_3$, 3 H)

IR (neat, cm$^{-1}$): 2976(s), 2918(w), 2162(s), 1410(w), 1260(s), 1030-1140 (broad,s), 830-920 (broad,s), 769(s), 715(w).

This is the procedure described by D. Seyferth, C. Prud'homme and G. H. Wiseman (*Inorg. Chem.*, 22 (1983) 2163) in the hydrolysis of $CH_3SiHCl_2$. A good yield of cyclic $[CH_3Si(H)O]_n$ oligomers was reported, mostly n=4, 5 and 6, but some higher n (up to n=22) was also obtained in lower yield. The ceramic yield of these oligomers is low and will vary from 0 to 5% depending upon the pyrolysis conditions and the particular oligomer used.

b. Preparation of Mixed Siloxane $[(CH_3Si(H)O)_r((CH_3)_2SiO)_s]_n$(IV-46)

A 500 ml three-necked, round-bottomed flask equipped with a stir-bar, a reflux condenser, and a serum cap was charged with 100 ml (0.96 mol) of $CH_3SiHCl_2$, 50 ml (0.41 mol) of $(CH_3)_2SiCl_2$, and 250 ml of $CH_2Cl_2$. To the solution there was added 60 ml (3.33 mol) of $H_2O$ (slowly by syringe pump) over a 4 hour period. Reaction occurred immediately. The reaction mixture was stirred at room temperature for 24 hours and then was washed with fifteen 200 ml portions of $H_2O$ until the $H_2O$ washings were neutral pH. The CH$_2$Cl$_2$ layer was dried over MgSO$_4$ and the solvent was removed by rotary evaporation to give 64.7 g (87% yield by weight) of a clear oil $^1$H NMR (90 MHz, C$_6$D$_6$): δ4.99 (broad, SiH, 1 H) 0.22, 0.16 (broad, SiCH$_3$, 6H).

IR (neat, cm$^{-1}$): 2972(s), 2168(s), 1410(w), 1260(s), 1030-1120 (broad,s), 880(s), 836(s), 804(s), 769(s), 708(w).

C. Characterization of Commercial [CH$_3$Si(H)O]$_n$(Petrarch PS-122)

IR (neat): 2982(m), 2171(s), 1413(w), 1262(s), 1030-1140 (s,broad), 860-905 (s,broad), 765(s), 718(w) cm$^{-1}$.

$^1$H NMR (C$_6$D$_6$): δ0.25 (broad s, SiCH$_3$, 3.4H), 5.04 (broad s, SiH, 1H).

Average Molecular Weight: 4500-5000 (vendor data).

Ceramic Yield: (TGA, 25°-1000° C., 10° C./minute): 13% (black solid).

IV. Graft Reactions

A. Graft Reaction of the Coammonolysis Product of Methyldichlorosilane and Vinyltrichlorosilane (3:1 Ratio. THF) and Polymethylhydridosiloxane (PS 122) with Potassium Hydride in THF.

A 100 ml, three-necked, round-bottomed flask was equipped with a reflux condenser with gas inlet tube on top, a stir-bar and two septa and oven-dried for 1 hour. (This will be termed the "standard reaction apparatus".) The apparatus was taken into the dry box and charged with Potassium hydride (0.02 g, 0.50 mmol) and was then connected to a nitrogen line, and charged with 50 ml of THF. The oil (1.64 g. 26.0 mmol) from the coammonolysis of CH$_3$SiHCl$_2$ and CH$_2$=CHSiCl$_3$ (3:1 ratio) in THF was added dropwise by syringe over 15 minutes. Gas evolution was observed. The reaction mixture was stirred for an additional hour at room temperature. By syringe, polymethylhydridosiloxane (Petrarch Systems, Inc. PS 122) (1.59 g, 26.5 mmol) was added to the reaction mixture. After stirring 35 minutes, methyl iodide (0.46 g, 3.2 mmol) was added and an immediate white precipitate formed. The solvent was removed by trap-to-trap distillation (25° C., 0.03 mm Hg) and the residue extracted with 40 ml of hexane. The reaction mixture was centrifuged and the supernatant liquid cannulated into a 100 ml flask. Removal of the hexane by trap-to-trap distillation left a white solid (2.44 g, 75%).

$^1$H NMR (CDCl$_3$, 250 MHz): δ0.17 (broad, 9.7 H, SiCH$_3$), 0.99 (broad, 3.0 H, NH), 4.38 (broad, 0.07 H, SiH), 4.74 (broad, 0.93 H, SiH), 5.91 (broad, 2.1 H, SiCH=CH$_2$).

IR (CCl$_4$, cm$^{-1}$): 3400(s), 3050(m), 3010(sh), 2960(s), 2900(sh), 2140-2120 (broad, s), 1595(m), 1405(s), 1270-1250 (broad, vs), 1200-1020 (broad, vs), 990-840 (broad, vs).

MW (cryoscopy in benzene): 1340 g/mol.

TGA (10° C./min, Ar, 50°-950° C.): 86% ceramic yield, black residue.

B. Graft Reaction of the Coammonolysis Product of Methyldichlorosilane and Vinyltrichlorosilane (3:1 Ratio, THF) and Polymethylhydridosilane with Potassium Hydride in THF The standard reaction apparatus was charged with potassium hydride (0.02 g, 0.50 mmol) and 50 ml THF as previously described. The oil 1.70 g, 27.1 mmol) from the coammonolysis of CH$_3$SiHCl$_2$ and CH$_2$=CHSiCl$_3$ (3:1 ratio) in THF was added dropwise over 15 minutes. Gas evolution was observed. The reaction mixture was stirred an additional hour at room temperature. Polymethylhydridosilane (1.24 g, 28.2 mmol) from the reaction of CH$_3$SiHCl$_2$ and excess sodium in a 6:1 hexane/THF solvent mixture was added by syringe. The reaction mixture became orange and then after 10 minutes turned yellow. The reaction mixture was stirred an additional 35 minutes at room temperature and then methyl iodide (0.46 g, 3.2 mmol) was added by syringe. An immediate white precipitate formed and the yellow color of the reaction mixture was discharged. The solvent was removed by trap-to-trap distillation and the residue extracted with 40 ml hexane The reaction mixture was centrifuged and the supernatant liquid cannulated into a 100 ml flask. Removal of the hexane by trap-to-trap distillation left a white solid (2.74 g, 93%).

$^1$H NMR (CDCl$_3$, 250 MHz): δ0.28 (broad, 3.1 H, SiCH$_3$), 1.25 (broad, 0.55 H, NH), 3.65 (broad, 0.21 H, SiH), 4.38 (broad, 0.35 H, SiH), 4.76 (broad, 0.44 H, SiH), 5.95 (broad, 0.53 H, SiCH=CH$_2$).

IR (CCl$_4$, cm$^{-1}$): 3390(w), 3150(w), 3050(m), 2960(s), 2900(m), 2160-2140 (broad, vs), 1410(s), 1260(s), 1190-1140 (broad, s), 1040-840 (broad, vs), 710 (vs), 590(w).

MW (cryoscopy in benzene): 1612 g/mol.

TGA (10° C./min., Ar, 50°-950° C.): 86% ceramic yield, black solid residue.

C. Graft Reacton of the Coammonolysis Product of Methyldichlorosilane and Vinyltrichlorosilane (3:1 Ratio, THF) and Polycarbosilane (Dow Corning X9-6348) with Potassium Hydride in THF The apparatus was charged with potassium hydride (0.02 g, 0.50 mmol) and 50 ml of THF. The oil (1.65 g, 26.0 mmol) from the coammonolysis of CH$_3$SiHCl$_2$ and CH$_2$=CHSiCl$_3$ (3:1 ratio) in THF was added dropwise by syringe over 15 minutes. Gas evolution was observed. The reaction mixture was stirred for an additional hour at room temperature. Polycarbosilane (1.64 g, 28.0 mmol, Dow Corning X9-6348) was ground to a fine powder with a mortar and pestle and placed in a 25 ml, one-necked flask. The flask was degassed and then 10 ml of THF was added. The resulting solution was cannulated into the reaction mixture. After stirring for 35 minutes., methyl iodide (0.46 g, 3.2 mmol) was added and an immediate white precipitate formed. The solvent was removed by trap-to-trap distillation (25° C., 0.03 mm Hg) and the residue extracted with 40 ml of hexane. The reaction mixture was centrifuged and the supernatant liquid cannulated into a 100 ml flask. Removal of the hexane by trap-to-trap distillation left a white solid (3.04 g, 92%).

$^1$H NMR (CDCl$_3$, 250 MHz): δ0.16 (broad, 5.6 H, SiCH$_3$), 0.95 (broad, 1.25 H, NH), 4.16 (broad, 0.3 H, SiH), 4.71 (broad, 0.7 H, SiH), 5.91 (broad, 0.8 H, SiCH=CH$_2$).

IR (CCl$_4$, cm$^{-1}$): 3400(s), 3050(m), 3010(sh), 2960(s), 2900(m), 2120-2100 (broad, s), 1600(w), 1410(s), 1360(m), 1270-1250 (broad, vs), 1190-1130 (broad, vs), 1050-840 (broad, vs).

MW (cryoscopy in benzene): 862 g/mol.

TGA (10° C./min, Ar, 50°-950° C.) 85% ceramic yield, black solid residue.

D. Graft Reaction of the Coammonolysis Product of Methyldichlorosilane and Trichlorosilane (3:1 Ratio, THF) and Polymethylhydridosiloxane (PS 122) with Potassium Hydride in THF A three-necked round-bottomed flask was equipped with a gas inlet tube, a stir-bar and two septa, oven-dried for 1 hour and then was charged with potassium hydride (0.02 g, 0.50 mmol). The apparatus was then connected to a nitrogen line and 50 ml of THF was added. The oil (1.64 g, 0.029 mol) from the coammonolysis of $CH_3SiHCl_2$ and $HSiCl_3$ (3:1 ratio) in THF, was added over 5 minutes. Gas evolution was observed. The reaction mixture was stirred for an additional 45 minutes at room temperature. By syringe, polymethylhydridosiloxane (1.58 g. 0.026 mol., Petrarch Systems, Inc., PS 122) was added to the reaction mixture. After stirring 30 minutes, methyl iodide (0.46 g, 3.2 mmol) was added and an immediate white precipitate formed. The solvent was removed by trap-to-trap distillation (25° C., 0.1 mm Hg) and the residue extracted with 40 ml of hexane. The reaction mixture was centrifuged and the supernatant liquid cannulated into a 100 ml flask. Removal of the hexane by trap-to-trap distillation left a white solid (2.30 g, 71%).

$^1H$ NMR ($CDCl_3$, 250 MHz): $\delta$0.10 (broad, 4.5 H, $SiCH_3$), 0.93 (broad, 2.0 H, NH), 4.84 (broad, 1.0 H, SiH).

IR ($CCl_4$, $cm^{-1}$): 3490(w), 3400(s), 2960(s), 2900(w), 2870(sh), 2820(w), 2130(s), 1580(w), 1425(m), 1265 (broad, s), 1200-1020 (broad, vs), 980-850 (broad, vs).

MW (cryoscopy in benzene); 1855 g/mol.

TGA (10° C./min, Ar, 50°-950° C.) 88% ceramic yield, black solid residue.

E. Graft Reaction of the Coammmonolysis Product of Methyldichlorosilane and Trichlorosilane (3:1 Ratio, THF) and Polymethylhydridosilane with Potassium Hydride in THF The apparatus was charged with KH (0.02 g, 0.50 mmol) and 50 ml of THF. The oil (1.77 g, 0.031 mol) from the coammonolysis of $CH_3SiHCl_2$ and $HSiCl_3$ (3:1 ratio) in THF was added over 5 minutes. Gas evolution was observed. The reaction mixture was stirred an additional 45 minutes at room temperature. Polymethylhydridosilane (1.30 g, 0.030 mol) from the reaction of $CH_3SiHCl_2$ and excess sodium in 6:1 hexane/THF was added. The reaction mixture became orange and then after 10 minutes turned yellow. The reaction mixture was stirred an additional 30 minutes at room temperature and then methyl iodide (0.46 g, 3.2 mmol) was added. An immediate white precipitate formed and the yellow color of the mixture was discharged. The solvent was removed by trap-to-trap distillation and the residue extracted wtin 40 ml of hexane. The reaction mixture was centrifuged and the supernatant liquid cannulated into a 100 ml flask. Removal of the hexane by trap-to-trap distillation left a white solid (2.70 g, 88%).

$^1H$ NMR ($CDCl_3$, 250 MHz): $\delta$0.30 (broad, 2.6 H, $SiCH_3$), 1.23 (broad, 0.58 H, NH), 3.65 (broad, 0.19 H, SiH), 4.4 (broad, 0.28 H, SiH), 4.8 (broad, 0.53 H, SiH).

IR ($CCl_4$, $cm^{-1}$: 3670 (broad, w), 3490 (m), 3150 (s), 3060 (s), 2960(s), 2900(w), 2280(s), 2150 (broad, vs), 1815(s), 1670(w), 1415(s), 1265(s), 1190 (broad, w), 1050-1020 (broad, vs), 980-850 (broad, vs), 700(w).

MW (cryoscopy in benzene): 2200 g/mol.

TGA (10° C./min., Ar, 50°-950° C.) 75% ceramic yield, black solid residue.

F. Graft Reaction of the Coammonolysis Product of Methyldichlorosilane and Trichlorosilane (3:1 Ratio, THF) and Polycarbosilane (Dow Corning X9-6348) with Potassium Hydride in THF The apparatus was charged with KH (0.02 g, 0.50 mmol) and 50 ml of THF. The oil (1.61 g, 0.028 mol) from the coammonolysis of $CH_3SiHCl_2$ and $HSiCl_3$ (3:1 ratio) in THF was added over 5 minutes. Gas evolution was observed. The reaction mixture was stirred an additional 30 minutes at room temperature. Polycarbosilane (1.45 g, 0.025 mol, Dow Corning X9-6348) was ground to a fine powder and placed in a 25 ml one-necked flask. The flask was degassed and then 10 ml of THF was added. This solution was then cannulated into the reaction mixture. After stirring for 30 minutes, methyl iodide (0.46 g, 3.2 mmol) was added and an immediate white precipitate formed. The solvent was removed by trap-to-trap distillation (25° C., 0.1 mm Hg) and the residue extracted with 40 ml of hexane. The reaction mixture was centrifuged and the supernatant liquid cannulated into a 100 ml flask. Removal of the hexane by trap-to-trap distillation left a white solid (2.97 g, 95%).

$^1H$ NMR ($CDCl_3$, 250 MHz): $\delta$0.16 (broad, 5.0 H, $SiCH_3$), 0.95 (broad, 0.8 H, NH), 1.24 (0.7 H, NH), 4.4 (broad, 0.3 H, SiH), 4.8 (broad, 0.7 H, SiH).

IR ($CCl_4 cm^{-1}$): 3490(w), 3400(s), 2960(s), 2900(m), 2875(sh), 2120 (broad, s), 1460(w), 1415(m), 1365(m), 1260(s), 1175 (broad, vs), 1030 (broad, s), 1080-850 (broad, vs).

MW (cryoscopy in benzene): 845 g/mol.

TGA (10° C./min., Ar, 50°-950° C.) 76% ceramic yield, black solid residue.

TABLE 2
HYBRID POLYMERS

| Reaction | Product | Yield, % | MW | Ceramic Yield by TGA, % |
|---|---|---|---|---|
| 3:1 $CH_3SiHCl_2$/ $ViSiCl_3$ (THF) with KH/PS 122 | solid | 75 | 1340 | 86 |
| 3:1 $CH_3SiHCl_2$/ $ViSiCl_3$ (THF)* with KH/D.C. Polycarbosilane | solid | 92 | 862 | 85 |
| 3:1 $CH_3SiHCl_2$/ $ViSiCl_3$ (THF) with KH/$(CH_3SiH)_{0.78}$−$(CH_3Si)_{0.22}$ | solid | 93 | 1612 | 86 |
| 3:1 $CH_3SiHCl_2$/ $HSiCl_3$ (THF) with KH/PS 122 | solid | 71 | 1855 | 88 |
| 3:1 $CH_3SiHCl_2$/ $HSiCl_3$ (THF) with KH/D.C. Polycarbosilane | solid | 95 | 845 | 76 |
| 3:1 $CH_3SiHCl_2$/ $HSiCl_3$ (THF) with KH/$(CH_3SiH)_{0.78}$−$CH_3Si)_{0.22}$ | solid | 88 | 2200 | 75 |

*Vi = vinyl

V. "In-Situ Procedure"

A. Reaction of a Coammonolysis Mixture of $CH_3SiHCl_2/HSiCl_3$ and $[(CH_3SiH)_x(CH_3Si)_y]_n$ with KH Catalyst

1. Using Coammonolysis Product Prepared in Diethyl Ether

In a dry box, a 250 ml round-bottomed flask equipped with a stir-bar, reflux condenser and a serum cap is charged with 0.10 g of KH (0.0025 mol). THF (50 ml) is added to suspend the KH. A separate 250 ml Schlenk flask is charged with 2.0 g of a $CH_3SiHCl_2/HSiCl_3$ coammonolysis mixture that is prepared as described in section II. This mixture is prepared by ammonolysis of $CH_3SiHCl_2$ and $HSiCl_3$ in ether solution and then combined with 2.2 g of $[(CH_3SiH)_x(CH_3Si)_y]_n$ (0.05 mol. x=0.74, y=0.26), and 100 ml of THF. The mixed polymer solution is transferred by cannula into the KH suspension. The reaction mixture gradually changes color to light orange and hydrogen gas is slowly evolved. The resulting solution is stirred at room temperature for 14 hours and is then heated at reflux for 1 hour. The light orange color of the solution persists. The reaction mixture is allowed to cool to room temperature and 0.5 ml (7.9 mmol) of $CH_3I$ is added to form a white precipitate. The solvent is removed by trap-to-trap distillation. The product is extracted with 200 ml of hexane and the insoluble residue is removed by centrifugation.

The clear, colorless supernatant layer is transferred via cannula into a weighed 250 ml round-bottomed flask. The hexane is removed by trap-to-trap distillation leaving 3.8 g (91% by weight) of a white powder. The latter is soluble in THF, benzene, and hexane.

2. Using a Coammonolysis mixture of $CH_3SiHCl_2/HSiCl_3$ Prepared in THF

According to the procedure described above, the reaction between 0.1 g of KH (0.0025 mol), 2.0 g of the coammonolysis product of $CH_3SiHCl_2/HSiCl_3$ (prepared in THF solution), and 2.2 g of $[(CH_3SiH)_x(CH_3Si)_y]_n$ (x=0.74, y=0.26) is carried out under nitrogen. The resulting reaction mixture also gradually changes color to light orange with slow evolution of hydrogen gas. The solution is stirred at room temperature for 14 hours and then 0.5 ml (7.9 mmol) of $CH_3I$ is added. Work-up as described in the previous experiment leaves a white, soluble solid.

B. Reactions of a Mixture of a Coammonolysis Mixture and Polycarbosilane with KH Catalyst.

1. Using a Coammonolysis Mixture of $CH_3SiHCl_2/HSiCl_3$ Prepared from Diethyl Ether.

Polycarbosilane/Coammonolysis Mixture in 1:1 weight ratio

In a dry box, a 250 ml round-bottomed flask equipped with a stir-bar, reflux condenser and a serum cap is charged with 0.15 g of KH (3.75 mmol). THF (50 ml) is added to suspend the KH. A separate 250 ml Schlenk flask is charged wtih 5.0 g of the coammonolysis product of $CH_3SiHCl_2$ and $HSiCl_3$ prepared in ether solution, and 5.0 g of polycarbosilane, and 150 ml of THF. The mixed polymer solution is transferred by cannula into the KH suspension in THF. The reaction mixture gradually turns clear and hydrogen gas slowly evolves. The resulting solution is stirred at room temperature for 2 hours and is then heated at reflux for 24 hours. The reaction mixture is allowed to cool to room temperature and 0.5 ml (7.9 mmol) of $CH_3I$ is added and the mixture is heated for several hours. The solvent is removed by trap-to-trap distillation. The product is extracted with 200 ml of hexane and the insoluble residue is removed by centrifugation. The clear, colorless supernatant layer is transferred via a cannula into a weighed 250 ml round-bottomed flask. The hexane is removed by trap-to-trap distillation leaving a white powder. The white powder is soluble in THF, benzene, and hexane.

C. Reactions of a Mixture of a Coammonolysis Mixture and cyclic $[CH_3Si(H)O]_n$ with KH catalyst

1. $[CH_3Si(H)O]_n$Coammonolysis Mixture of $CH_3SiHCl_2/HSiCl_3$ in 1:1 weight ratio In a dry box, a 250 ml round-bottomed flask equipped with a stir-bar, reflux condenser, and a serum cap is charged with 0.1 g of KH (2.50 mmol). THF (100 ml) is added to suspend the KH. A separate 250 ml flask is charged with 4.0 g of the product, prepared by coammonolysis of $CH_3SiHCl_2$ and $HSiCl_3$ in THF solution, and 3.6 g of $[CH_3Si(H)O]_n$, and 50 ml of THF. This solution is transferred by cannula into the KH suspension in THF. The reaction mixture gradually turns clear and hydrogen gas is slowly evolved. The resulting solution is stirred at room temperature for 4 hours and then 0.5 ml (7.9 mmol) of $CH_3I$ is added. The solvent is removed by trap-to-trap distillation. The residual solid is treated with 80 ml of hexane and the insoluble residue is removed by centrifugation. The clear, colorless supernatant layer is transferred via cannula into a weighed 100 ml round-bottomed flask. The hexane is removed by trap-to-trap distillation leaving of a white powder. The latter is soluble in THF, benzene, and hexane.

This invention has been described in detail with reference to the Preferred embodiments thereof. However, it will be appreciated that these skilled in the art, upon consideration of this disclosure, may make modifications and improvements within the spirit and scope of the invention.

We claim:

1. A method for preparing preceramic organosilicon polymers, wherein the method comprises:
   (a) mixing an organosilicon polymer containing Si—H repeat units with at least a catalytic amount of an alkali metal amide or a silylamide in an organic solvent;
   (b) allowing the mixture of step (a) to react at room temperature or above; and
   (c) quenching the reaction mixture with a reactive electrophile, thereby forming said preceramic organosilicon polymer.

2. The method of claim 1, wherein the silylamide is a polymeric silylamide formed by reacting in solution anhydrous ammonia with a mixture of $R^1SiHX_2$, wherein $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms, and X is a halogen, and $R^2SiX_3$, wherein $R^2$ is H, a lower alkyl group having from 1 to about 6 carbon atoms, a substituted or unsubstituted cycloalkyl group having from 3 to about 6 carbon atoms, or a substituted or unsubstituted lower alkenyl group having from 2 to about 6 carbon atoms, or a substituted or unsubstituted lower aryl group having from 6 to about 10 carbon atoms, thereby forming a polysilazane; and reacting said polysilazane in the presence of a basic catalyst capable of deprotonating the NH functions in said polysilazane to form said polymeric silylamide.

3. The method of claim 2 wherein the Si—H containing organosilicon polymer is selected from the group consisting of an organopolysilane of the formula $[(RSiH)_x(RSi)_y]_n$, where $x+y=1$, R is a lower alkyl group having from 1 to about 6 carbon atoms, a lower alkenyl group having 2 to about 6 carbon atoms, a substituted or unsubstituted lower aryl group having from 6 to about 10 carbons atoms, and n is an integer greater than 1; a polycarbosilane having a plurality of repeat units of the formula $[R^aSi(H)-(CH_2)_q]$ where $R^a$ is H, a lower alkyl group having from 1 to about 6 carbon atoms, a cycloalkyl group having 3 to about 6 carbon atoms, a substituted or unsubstituted lower aryl group having from 6 to about 10 carbon atoms, and q is an integer 1 or greater; and a polysiloxane having a plurality of repeat units of the formula $R^bSi(H)O]_n$ where $R^b$ is a lower alkyl group having from 1 to about 6 carbon atoms, a cycloalkyl group having 3 to about 6 carbon atoms, a substituted or unsubstituted lower aryl group having from 6 to about 10 carbon atoms, and n is an integer greater than 1.

4. The method of claim 3 wherein the polycarbosilane contains at least about 25 mole % of repeat units of the formula $[R^aSi(H)-(CH_2)_q]$ and the polysiloxane contains at least about 25 mole % of repeat units of the formula $[R^bSi(H)O]_n$.

5. The method of claim 3, wherein R, $R^a$ and $R^b$ are a lower alkyl group.

6. The method of claim 3, wherein R, $R^a$ and $R^b$ are $CH_3$.

7. The method of claim 3, wherein the Si—H containing the organosilicon polymer is an organopolysilane and $x=1$, $y=0$.

8. The method of claim 3 wherein the reaction mixture is quenched with an electrophile, $E-X^1$, where E is selected from the group consisting of lower alkyl groups and silyl groups and $X^1$ is selected from the group consisting of halogen, sulfate and sulfonate.

9. The method of claim 3 wherein the Si—H containing organosilicon polymer is organopolysilane, and the polymeric silylamide is added in a sufficient quantity so that the excess carbon obtained on pyrolysis of the silylamide can react with excess silicon from the pyrolysis of the organopolysilane compound, thus producing a ceramic product which contains substantially no free silicon or free carbon.

10. The method of claim 3 wherein $R^1$ is a lower alkyl group, $R^2$ is H or a lower alkyl group.

11. The method of claim 10 wherein $R^1$ is $CH_3$.

12. The method of claim 11 wherein $R^2$ is $CH_3$ or H.

13. The method of claim 10 wherein $R^2$ is $CH_3$ or H.

14. The method of claim 10 wherein R, $R^a$ and $R^b$ are $CH_3$.

15. The method of claim 9 wherein the mixture is allowed to react by stirring at room temperature, then heating at reflux.

16. The method of claim 9 wherein the mole ratio of organopolysilane to polymeric silylamide ranges from about 4:1 to about 1:4.

17. A preceramic polymer formed by the method of claim 3.

18. The method of claim 1 wherein the alkali metal amide is an alkali metal silylamide.

19. The method of claim 3 wherein the Si—H containing organosilicon polymer is a poly(phenyl)silicon polymer.

20. The method of claim 3 wherein the Si—H containing organosilicon polymer is a polycarbosilane and the weight ratio of polycarbosilane:silylamide is about 10:1 or less.

21. The method of claim 3 wherein the Si—H containing organosilicon polymer is a mixture of the polycarbosilane and the organopolysilane, with a sufficient quantity of the organopolysilane added so that the excess silicon obtained on pyrolysis of the organopolysilane can react with excess carbon from the pyrolysis of the polycarbosilane and the silylamide. thereby reducing the amount of free carbon.

22. A preceramic polymer produced by the method of claim 21.

23. The method of claim 3 wherein the Si—H containing organosilicon polymer is a polysiloxane and the weight ratio of polysiloxane:silylamide is from about 15:1 to 1:15.

24. The method claim 3, wherein the Si—H containing organosilicon polymer is a polysiloxane and the weight ratio of polysiloxane to alkali metal silylamide is about 5:1 to 1:5.

25. The method of claim 24 wherein the ratio is about 1:1.

26. A preceramic polymer formed by the method of claim 25.

27. A method for preparing a preceramic organosilicon polymer, wherein the method comprises:
(a) generating a polysilylamide in the presence of an Si—H containing organosilicon polymer wherein the polysilylamide is generated by reacting the coammonolysis product of a mixture of $R^1SiHX_2$, where $R^1$ is a lower alkyl group having from 1 to about 6 carbon atoms, a substituted or unsubstituted cycloalkyl group having from 3 to about 6 carbon atoms, a substituted or unsubstituted, lower alkenyl group having from 2 to about 6 carbon atoms, or a substituted or unsubstituted lower aryl group having from 6 to about 10 carbon atoms; and X is a halogen; with $R^2SiX_3$ wherein $R^2$ is H, a lower alkyl group having from 1 to about 6 carbon atoms, a substituted or unsubstituted cycloalkyl group having from 3 to about 6 carbon atoms, or a substituted or unsubstituted lower alkenyl group having from 2 to about 6 carbon atoms, or a substituted or unsubstituted lower aryl group having from 6 to about 10 carbon atoms in the presence of a basic catalyst capable of deprotonating the hydrogen from a nitrogen atom adjacent to a silicon atom to generate the polysilylamide in situ;
(b) allowing the in situ generated polysilylamide and the Si—H containing organosilicon polymer sufficient time to react with each other at room temperature; and
(c) quenching the mixture with an organic halide or halosilane to produce the organosilicon preceramic polymer.

28. The method of claim 27 wherein the Si—H containing organosilicon polymer is selected from the group consisting of an organopolysilane of the formula $[(RSiH)_x(RSi)_y]_n$, where $x+y=1$, R is a lower alkyl group having from 1 to about 6 carbon atoms, a lower alkenyl group having 2 to about 6 carbon atoms, a substituted or unsubstituted lower aryl group having from 6 to about 10 carbons atoms, and n is an integer greater than 1; a polycarbosilane having a plurality of repeat units of the formula [$R^a$Si(H)—(CH$_2$)$_q$] where $R^a$ is H, a lower alkyl group having from 1 to about 6 carbon atoms, a cycloalkyl group having 3 to about 6 carbon atoms, a substituted or unsubstituted lower aryl group having from 6 to about 10 carbon atoms, and q is an integer 1 or greater; and a polysiloxane having a plurality of repeat units of the formula [$R^b$Si(H)O]$_n$ where $R^b$ is a lower alkyl group having from 1 to about 6 carbon atoms, a cycloalkyl group having 3 to about 6 carbon atoms, a substituted or unsubstituted lower aryl group having from 6 to about 10 carbon atoms, and n is an integer 1 or greater.

29. The method of claim 28 wherein the polycarbosilane contains at least about 25 mole % of repeat units of the formula [$R^a$Si(H)—(CH$_2$)$_q$] and the polysiloxane contains at least about 25 mole % of repeat units of the formula [$R^b$Si(H)O]$_n$.

30. The method of claim 28, wherein R, $R^a$ and $R^b$ are a lower alkyl group.

31. The method of claim 28, wherein R, $R^a$ and $R^b$ are CH$_3$.

32. The method of claim 28 wherein $R^1$ is a lower alkyl group and $R^2$ is H or a lower alkyl group.

33. The method of claim 32 wherein $R^1$ is CH$_3$.

34. The method of claim 33 wherein $R^2$ is H or CH$_3$.

35. The method of claim 34 wherein $R^2$ is H.

36. The method claim 31 wherein $R^1$ is CH$_3$ and $R^2$ is H or CH$_3$.

37. The method of claim 28, wherein the Si—H containing organosilicon polymer is an organopolysilane and x=1, y=0.

38. The method of claim 28 wherein the Si—H containing organosilicon polymer is organopolysilane, and the organopolysilane is added in a sufficient quantity so that the excess carbon obtained on pyrolysis of the silylamide can react with excess silicon from the pyrolysis of the organopolysilane compound, thus producing a ceramic product which contains substantially no free silicon or free carbon.

39. The method of claim 28 wherein the mixture is allowed to react by stirring at room temperature, then heating at reflux.

40. The method of claim 28 wherein the mole ratio of organopolysilane to in situ generated silylamide ranges from about 4:1 to about 1:4.

41. The method of claim 28 wherein the Si—H containing organosilicon polymer is a mixture of the polycarbosilane and the organopolysilane, with a sufficient quantity of the organopolysilane added so that the excess silicon obtained on pyrolysis of the organopolysilane can react with excess carbon from the pyrolysis of the polycarbosilane and the in situ generated silylamide, thereby reducing the amount of free carbon.

42. The method of claim 28 wherein the Si—H containing organosilicon polymer is a polysiloxane and the weight ratio of polysiloxane: in situ generated silylamide is from about 15:1 to 1:15.

43. The method of claim 42 wherein the ratio is about 1:1.

44. A preceramic polymer formed by the method of claim 28.

* * * * *